Dec. 20, 1927.  
G. A. SCHWENZER ET AL  
1,653,231  
GASOLINE DISPENSING DEVICE  
Filed April 9. 1924 2 Sheets-Sheet 2
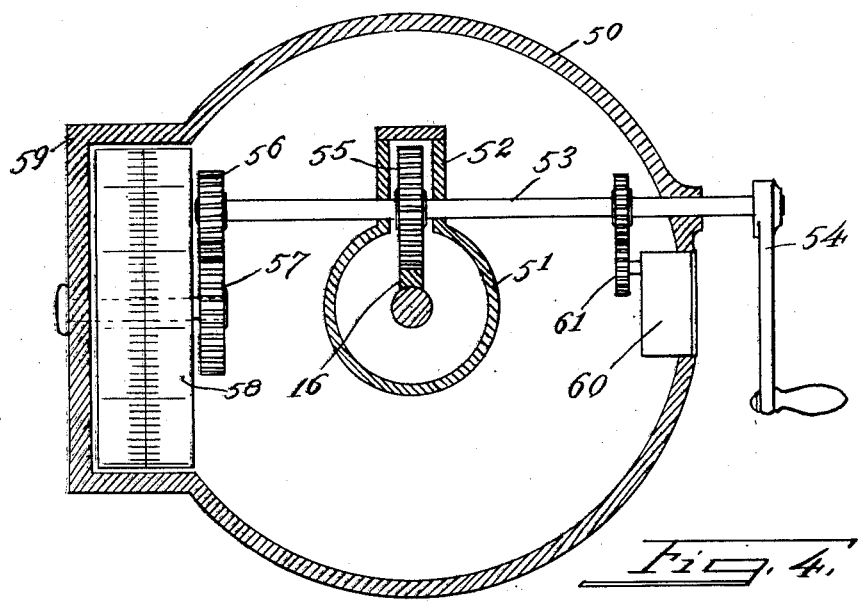
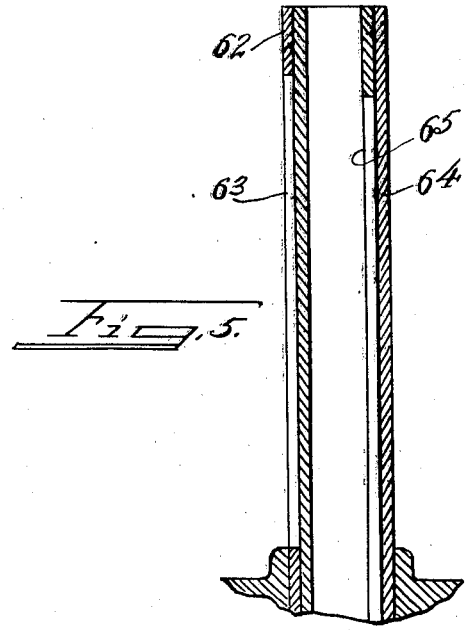
INVENTORS  
George A. Schwenzer  
Howard L. Stackhouse  
BY  
Allen & Allen  
ATTORNEYS.

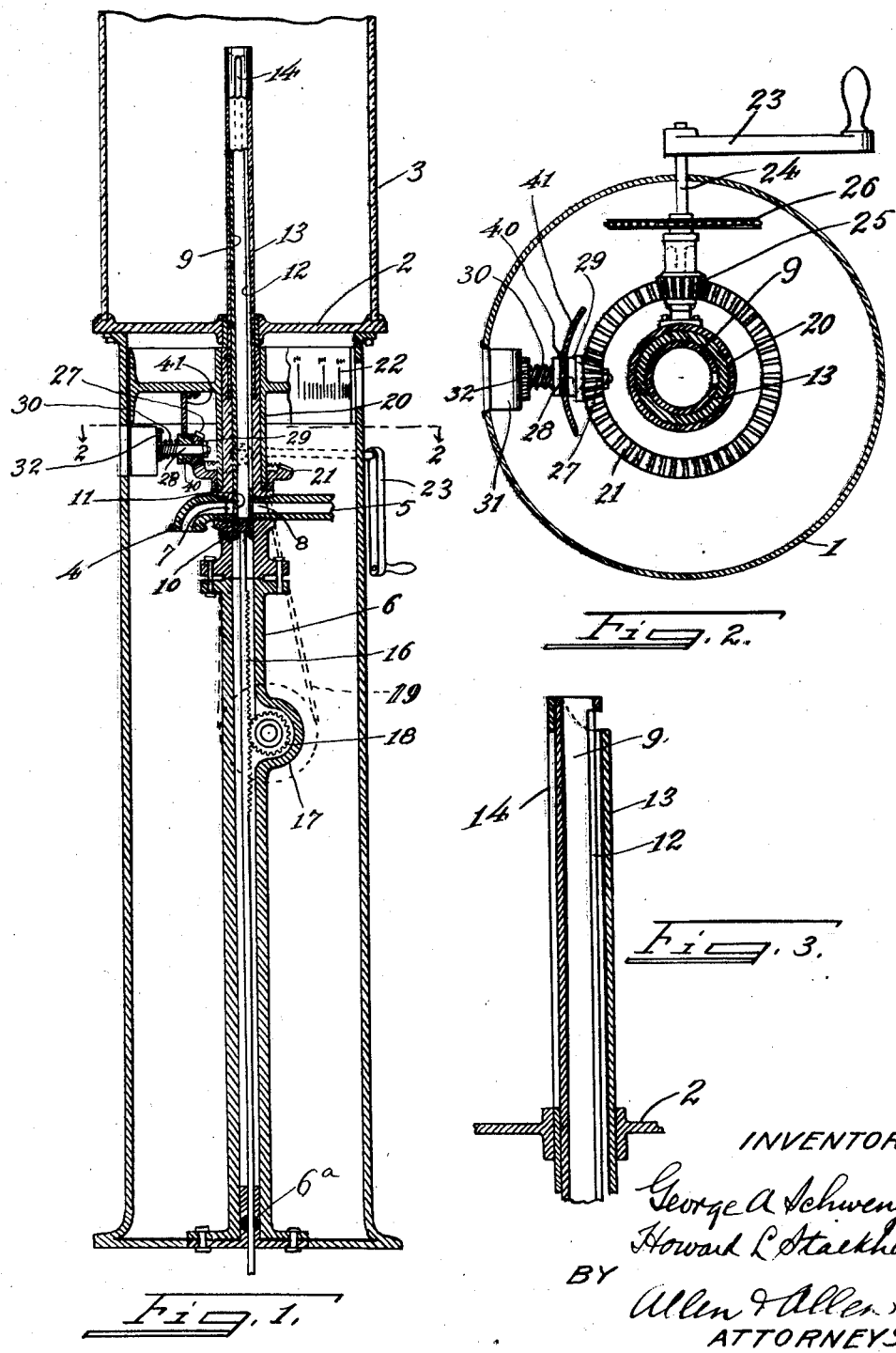

Patented Dec. 20, 1927.

1,653,231

UNITED STATES PATENT OFFICE.

GEORGE A. SCHWENZER AND HOWARD L. STACKHOUSE, OF CINCINNATI, OHIO, ASSIGNORS, BY MESNE ASSIGNMENTS, TO UNITED STATES PUMP CORPORATION.

GASOLINE-DISPENSING DEVICE.

Application filed April 9, 1924. Serial No. 705,319.

Our invention relates to devices for dispensing gasoline, of the visible or gravity feed type in which the liquid is drawn into an overhead vessel and then fed to the customer's tank by gravity.

It is our object to provide a device which is simple and effective for delivering, indicating and recording any desired amount of gasoline, from a device of the general type noted above.

The particular structure of our invention is based on the mode of dispensing gasoline in which the liquid is drawn into the overhead tank by means of differential air pressure, either forcing or "drawing" the liquid into the tank, and a level is then established by means of the fill pipe acting to drain away any excess over the predetermined level.

It is our object to provide a fixed fill pipe, which alternately acts to fill the tank and then drain away any excess over its top level. It is our object to provide a movable delivery control pipe, the position of which with relation to the level of the top of the fill pipe, will determine the amount of liquid that flows away.

Another object is to provide for means whereby the delivery control pipe serves as a valve, to direct the liquid flow, selectively from the reservoir to the tank and from the tank to the delivery hose. We desire to accomplish this without rotary motion, and to provide for a full, free flow of the liquid when being delivered.

It is further our object to provide that the motion imparted to the delivery control pipe and sleeve valve element, shall also be used to operate a recording and an indicating element, which indicating element can be read in terms of liquid measure and in terms of price also, due to the fact that the fractional amounts of gasoline to give a price in round numbers, can readily be determined by our device.

We have had to provide for means whereby the necessary movement of the moving delivery control pipe, that is required for it to act as a selective valve, will not affect the register that gives total quantity dispensed.

We accomplish our various objects above outlined by that certain construction and arrangement of parts to be hereinafter more specifically pointed out and claimed.

In the drawings:

Figure 1 is a central vertical section of our device.

Figure 2 is a section on the line 2—2 of Figure 1.

Figure 3 is a central vertical section through the pipes that lie in the gravity tank, taken at right angles to Figure 1.

Figure 4 is a cross section through a modified device for operating the rack.

Figure 5 is a longitudinal section through the fixed and movable pipes.

We have shown as indicating a casing, the shell 1, terminating in a plate 2 at the top of which is set the air tight tank 3, preferably of glass. We have not shown any means for setting up low pressure in the overhead tank, as there are a number of acceptable ways of accomplisihng this, known in the art.

The liquid comes into the tank through a pipe 4, and passes out to the customer through a pipe 5. These two pipes are screwed into a main stand pipe 6, which extends from the base of the mechanism up into the tank, to a height which will determine the upper level of liquid in the tank, when same is filled. This stand pipe which is shown as sectional, has a port 7 for the pipe 4 and a port 8 for the pipe 5.

The inner pipe 9, heretofore termed the delivery control pipe, is provided with a plug 10 to close it at the bottom. It slides in the stand pipe, and it is provided with a port 11 to register with the inlet port 7 and with an elongated port 12, to register with the port 8, during the full length of its movement.

We have shown the upper section of the stand pipe as a separate tube 13, fitted into the main stand pipe, but it will be understood that this is done for manufacturing convenience. The portion 13 of the stand pipe extends through the plate 2 into the tank and has an elongated port 14, extending from the base of the tank, to a point near the top of said pipe portion. This port 14 does not register with the long port 12 in the inner sliding pipe.

To move the sliding pipe a rack 16 is mounted at its lower end and the stand pipe is provided with a boss 17 in which is arranged a spur gear 18 which meshes with the rack. The shaft of this spur gear (suitably packed) passes out through the boss where it is equipped with a sprocket and chain 19.

The top of the pipe 13 is cut away to the level of the upper end of the port 14 therein. The port 12 in the sliding pipe is so formed and placed that it comes in line with the cut-away end of the fixed pipe, and the ports 11 and 12 are so spaced that when the port 11 is in position of opening into inlet port 7, then the top end of port 12 is above the cut-away side of the pipe 13, so that liquid level can be established by pipe 13, which liquid level will be the same as the top of the port 14 in said fixed pipe element.

When the port 12 has been moved far enough down so that it comes below the cut-away edge of the pipe 13, then the port 11 will have passed beyond port 7, and port 12 will have opened into port 8, thereby permitting liquid to flow out through the pipe 9, to the customer's tank.

Thus the operator will first move the sliding pipe up to its upper position. He will then set into operation the air exhausting system, to draw liquid up through port 7, pipe 9, and into the overhead tank. When the tank is filled to at least the level of the port 14 in the fixed pipe, and the cut-away top edge of said pipe, the operator will shut off the air system, and permit the level to be established by holding the sliding sleeve where it is, until the liquid drains back down through port 12 into pipe 9, and thence out through ports 11 and 7.

It will be assumed that the liquid level so established will be five gallons.

The operator then moves the pipe 9 downwardly, to a point which the indicator (to be described) will show is the amount of gasoline desired. This motion brings the top of the pipe 9 below the top of the port 14, in the fixed pipe 13, and it will also bring the valve port 11 away from the port 7.

As the port 12 extends above port 14 at full tank period, in raising the pipe 9 the valve formed by ports 7 and 11 will close before the port 14 is opened. In lowering the pipe 9 the port 12 will then open into the port 8, and liquid will flow through port 14 into pipe 9 over the top and out through port 12, through port 8 and into the delivery pipe.

As the size of these lengthwise ports can be made as wide as desired within the limits of the sizes of the pipes, a full and free delivery of gasoline can be provided. The level of the top of pipe 9 will define the amount of liquid which will flow out through the delivery pipe to the customer.

There are no rotary parts to be found, and the operation of forming, assembling and operating the device as so far described, is very simple and inexpensive.

The distance necessary for the pipe 9 to move prior to closing the valve through ports 11 and 7, is provided for at the top of pipe section 13, by the position of the top of port 12 with relation to the cut-away side of the top of the said pipe section 13.

Any liquid which escapes past the pipe 9 and flows down into the stand pipe, will be trapped and held there, by the packed joint 6ª for the end of the bar, that mounts the operating rack for the pipe 9.

The devices for indicating and registering the amounts of liquid dispensed, are provided for as follows: Around the stand pipe is journaled a sleeve 20. This sleeve carries a beveled gear 21, and at its upper end carries an indicator wheel 22.

The operating crank or handle 23 is mounted over a shaft 24, having a beveled gear 25 thereon which meshes with the gear 21 and drives it around. This shaft 24 has also a sprocket 26 thereon, from which a chain runs to the rack operating sprocket 19.

Mounted on any suitable bracket within the casing is a beveled pinion 27, loose on a shaft 28. The pinion has a conical inner face, which engages with a like face on a collar 29, keyed to slide but not rotate on the shaft 28. A spring 30 bears between the collar and a ratchet wheel that is fast on the shaft 28.

The shaft 28 drives any suitable register counter mounted in the casing 31. There is a pawl 32 on the casing which prevents the ratchet wheel and hence the shaft 28 from turning except in one direction.

The pinion 27 meshes with the beveled gear 21, and is driven by it, and drives the shaft 28 through the friction clutch formed between it and the conical face on the sliding collar on said shaft, said collar being pressed to friction engagement by the spring. When the pinion revolves in the direction in which the shaft 28 cannot turn, the clutch mechanism will slip.

To take care of the necessary valve closing movement during which the pipe 9 does not cause any outflow of liquids to the delivery pipe, so that this movement does not show on the register, we have made the following provision:—The sliding collar 29 last above noted is formed with a groove 40. On the under side of the indicator wheel is mounted a curved cam plate 41, which depends from the wheel to a position of engagement with the groove in the collar. The ends of the cam plate are beveled off, so that they will come into engagement with the collar, and during the delivery movement of the pipe 9, the cam will force outwardly the collar on the shaft 28, and thus break its frictional connection with the conical recess in the face of the loose pinion 27 on said shaft. The inertia of the register will prevent its operation during this period. To take care of the non-effective delivery movement of the indicator wheel, the indication marks thereon will be arranged to make no showing until the top of pipe 9 has reached the top of the port 14 in the fixed pipe section.

The reason for arranging for this free play, instead of merely beginning the slot 14 several inches below the top of the pipe 13, is that the last noted arrangement would prevent measuring off a quart or so of the liquid at the start of the movement of the pipe 9. It is evident that pipe 13, Figure 3, could be finished off without the cutback portion, and the top of the port 14 therein left as it is, whereupon the first inch or so of movement of pipe 9 would have no results until the top of pipe 9 came opposite the top of port 14, whereupon gasoline representing the depth from the top of pipe 13 to the top end of its port 14, would flow out, without further movement of pipe 9. No intermediate portions, however, could be measured. Thus the device for inhibiting the register would not be required in this last noted arrangement, as has been noted.

Thus in the modification 50 is the casing of the device and 51 the stand pipe. The boss or projecting stand pipe portion 52 serves as a central journal for the shaft 53, which is driven by an operating handle 54. A gear 55 on the shaft within the casing projection meshes with the rack 16 connected to the rod that carries the sliding pipe element.

The shaft 53 has a gear 56 at its end beyond the middle of the casing which meshes with a gear 57 on the supporting shaft of the indicator drum 58. The casing is provided with a projection 59, open at the top for view of the indicator drum, which by gear reduction noted will revolve once for about five steps of the rack 16.

The totalizer counter device may be set in a housing 60, and be driven by a pawl ratchet, the outer edge of which is shown at 61. The portion 61 is driven by a pinion on the shaft 53.

It may be noted that this structure greatly reduces the expense of the provision for measuring the first few quarts of liquid.

The two pipes within the tank may then be formed as shown in Figure 5, in which the outer pipe or fixed pipe 62 has the long port 63, terminating at the upper end, far enough below the top of the pipe to permit the inner pipe to move to position of closing the port 7, and opening the port 8 to the interior of the said sliding pipe, before the upper edge of the sliding pipe reaches the top of the said port 63. The sliding pipe 64 has the same structure as before, except that the long port 65 therein, need not terminate so near the top of the pipe. This gives better strength to the pipe, and cuts down chance of the sliding pipe developing a split down from the top.

Having described our invention, by an illustrative embodiment thereof, what we claim as new and desire to secure by Letters Patent, is:—

1. A gasoline dispensing device comprising a standard, a tank supported thereby, a fixed pipe extending into the tank, and a sliding pipe acting as a sleeve with relation to said fixed pipe, said fixed pipe having a longitudinal port therein adapted to be closed and exposed by movement of the sliding pipe, and means for delivering to the customer the liquid withdrawn through the sliding pipe.

2. A gasoline dispensing device comprising a standard, a tank supported thereby, a fixed pipe extending into said tank and terminating at a level defining position, a supply port and a delivery port in said fixed pipe for liquid forced into the tank and liquid withdrawn therefrom, an opening lengthwise of the fixed pipe within the tank, extending to the low drain point of the tank, and a sliding pipe acting as a sleeve with the fixed pipe having an inlet port in slidable alignment with the supply port in the fixed pipe and a delivery port in slidable alignment with the delivery port in the fixed pipe and portions of the pipe between the ports adapted to close the delivery opening in the fixed pipe when said sliding pipe is in position with its inlet port in open position with relation to the supply port in the fixed pipe.

3. A gasoline dispensing device comprising a standard, a tank supported thereby, a fixed pipe extending into said tank and terminating at a level defining position, a supply port and a delivery port in said fixed pipe for liquid forced into the tank and liquid withdrawn therefrom, an opening lengthwise of the fixed pipe within the tank, extending to the low drain point of the tank, and a sliding pipe acting as a sleeve with the fixed pipe having an inlet port in slidable alignment with the supply port in the fixed pipe and a delivery port in slidable alignment with the delivery port in the fixed pipe and portions of the pipe between the ports adapted to close the delivery opening in the fixed pipe when said sliding pipe is in position with its inlet port in open position with relation to the supply port in the fixed pipe, and the delivery port in said sliding pipe adapted to open into the delivery port in the fixed pipe, the delivery port extending longitudinally of the sliding pipe a distance equal at least to the length of the opening in the fixed pipe.

4. A gasoline dispensing device comprising a standard, a tank supported thereby, a fixed pipe section extending into the tank and terminating at a level defining position therein, a supply port and a delivery port in said fixed pipe, and an opening lengthwise of the fixed pipe extending upwardly from the low drain point of the tank, and a sliding sleeve valve within the fixed pipe, having a port adapted in the upper position of the sleeve to open the passage between the tank and the supply port, portions of the sleeve in its movement downwardly adapted to first close the supply port, and the port in the sleeve then adapted to open a passage between the delivery port and the tank for the balance of its downward movement.

5. A gasoline dispensing device comprising a standard, a tank supported thereby, a fixed pipe extending into the tank, and a sliding pipe acting as a sleeve with relation to said fixed pipe, said fixed pipe having a longitudinal port therein adapted to be closed and exposed by movement of the sliding pipe, and means for delivering to the customer the liquid withdrawn through the sliding pipe, means for moving the said sliding pipe lengthwise, and registering means driven by the said means for registering the movement of the sliding pipe in terms of liquid measure.

6. A gasoline dispensing device comprising a standard, a tank supported thereby, a fixed pipe extending into the tank, and a sliding pipe acting as a sleeve with relation to said fixed pipe, said fixed pipe having a longitudinal port therein adapted to be closed and exposed by movement of the sliding pipe, and means for delivering to the customer the liquid withdrawn through the sliding pipe, rotary means for moving the said sliding pipe lengthwise, and registering means driven by the said means for registering the movement of the sliding pipe in terms of liquid measure, and an indicator also driven by said rotary means for indicating in terms of liquid measure the movement of said sliding pipe.

7. A gasoline dispensing device comprising a standard, a tank supported thereby, a fixed pipe extending into said tank, and terminating at a level defining position, an opening in said fixed pipe extending from the level defining position to the low drain point of the tank, a supply port and delivery port in said fixed pipe, and a sliding sleeve mounted within the fixed pipe, said sleeve having a lengthwise port therein, and a port for registering with the supply port above noted, said ports being arranged so that when the sleeve is elevated the supply port in the fixed pipe will be opened with relation to the registering port in the sleeve, and the lengthwise port in the sleeve will be open with relation to the top of the fixed pipe, and that when the sleeve has been moved with its top to the level of the first mentioned opening in the fixed pipe, portions of the sleeve will have closed the supply port in the fixed pipe and the lengthwise port in the sleeve will have opened at its lower end into the delivery port of the fixed pipe.

8. A gasoline dispensing device comprising a standard, a tank supported thereby, a fixed pipe extending into said tank, and terminating at a level defining position, an opening in said fixed pipe extending from the level defining position to the low drain point of the tank, a supply port and delivery port in said fixed pipe, and a sliding sleeve mounted within the fixed pipe, said sleeve having a lengthwise port therein, and a port for registering with the supply port above noted, said ports being arranged so that when the sleeve is elevated the supply port in the fixed pipe will be opened with relation to the registering port in the sleeve, and the lengthwise port in the sleeve will be open with relation to the top of the fixed pipe, and that when the sleeve has been moved with its top to the level of the first mentioned opening in the fixed pipe, portions of the sleeve will have closed the supply port in the fixed pipe and the lengthwise port in the sleeve will have opened at its lower end into the delivery port of the fixed pipe, means for moving the said sleeve lengthwise, and registering means driven by the said moving means for registering in terms of liquid measure the movements of said sleeve downwardly, and an element to prevent operation of the registering means during the movement of the sleeve from its upper position to position where its upper end is in open position with relation to the lengthwise opening in the fixed pipe.

HOWARD L. STACKHOUSE.
GEORGE A. SCHWENZER.